United States Patent Office 3,241,913
Patented Mar. 22, 1966

3,241,913
PROCESS FOR ACTIVATING TITANIUM SUBHALIDE AS A CATALYST BY GRINDING SAME
Robert M. Fowler, Niagara Falls, N.Y., assignor to Union Carbide Corporation, a corporation of New York
No Drawing. Filed Apr. 22, 1963, Ser. No. 274,832
4 Claims. (Cl. 23—87)

The present invention relates to the preparation of an improved polymerization catalyst. More particularly, the present invention relates to a mechanical activation process for providing an improved catalyst for the polymerization of alpha-olefins.

In the polymerization of alpha-olefins, it is important to employ catalysts which have the capability of causing the growth of the polymer from the monomer so that the substituent of the ethylene group will always appear in the same relative position to the chain. Such catalysts are called stereospecific and the product polymer is referred to as isotactic. Isotactic polymers are advantageous in several respects, for example, isotactic polypropylene is harder, stronger and more heat resistant than other polymer arrangements.

The sub-halides of titanium, particularly $TiCl_3$, are known as polymerization catalysts and are used with metallo-organic compounds of metals having small ionic radii such as

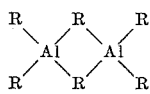

where R is an alkyl group, to polymerize alpha-olefins to crystalline polymers.

Other metallo-organic compounds with which $TiCl_3$ is used in polymerization processes are the alkyls and aryls of beryllium, aluminum, gallium and indium.

Although the sub-halides of titanium, notably $TiCl_3$, crystallize in different forms, depending upon the method of preparation, all such forms are "stereospecific" to some extent. The greatest stereospecificity is achieved with alpha-$TiCl_3$ (violet modification).

Ordinarily, the catalytic activity of titanium sub-halide material can be improved somewhat by comminution, however, the improvement is less than what would be expected.

It is therefore an object of the present invention to provide a process for improving the catalytic activity of titanium sub-halides.

Other objects will be apparent from the following description and claims.

A process in accordance with the present invention for improving the catalytic activity of titanium subhalide material comprises grinding the titanium sub-halide material under ambient temperature conditions of from +30° C. to —50° C. The preferred ambient temperature conditions, to obtain efficient activation of the catalyst material, are from +20° C. to 0° C.

In the practice of the present invention the catalyst material, e.g. $TiCl_3$ is charged to a suitable grinding apparatus for example the Vibra Tom mill, Model 125–L*. The grinding elements, which can for example be steel mill balls, and the charge are cooled to an ambient temperature between +30° C. and —50° C.; in the specific aforementioned apparatus, a cooling jacket is provided in which refrigerant fluids can be circulated to provide the desired ambient temperature. Suitable refrigerant fluids include brine, ethylene glycol, liquid nitrogen, fluorinated hydrocarbons and water.

*Sold by Schutz-O'Neil Company, Minneapolis, Minn., and described in Bulletin KP–57–C/559.

When the desired ambient temperature is achieved, which can be established by checking the temperature of the charge and the grinding elements, comminution of the catalytic material is commenced. From time to time, the grinding operation can be suspended to re-check the temperature of the grinding elements and the charge to ensure that the ambient temperature is at the desired value in the range of +30° C. to —50° C. Also, the temperature of the refrigerant fluid is checked periodically to detect any rise in temperature which might warrant increased cooling of the grinding apparatus.

In the usual practice of the present invention, the initial sizing of the charge material is about 100 microns and the final sizing is 2 microns or less.

When the catalytic material has been cold-ground to the desired size, e.g. 2 microns, it is removed from the grinding apparatus and is directly usable in polymerization processes. The product of the present invention is particularly suitable in the polymerization and co-polymerization of olefins of the general formula $RCH=CH_2$, where R is preferably H or lower alkyl, but may also be higher alkyl, alkenyl, alicyclic or aryl.

Ordinarily, the best method of determining and comparing the activity of a $TiCl_3$ polymerization catalyst is to actually carry out a polymerization. Auxiliary methods such as chemical analysis, X-ray analysis and microscopy permit a qualitative determination of activity, but usually lack sufficient sensitivity to be a predominant test for quality control.

In order to test the activity of catalyst prepared in accordance with this invention, polymerization experiments were performed at both atmospheric pressure and at elevated pressure. Activity measurements in gram of polypropylene polymer obtained per gram of catalyst showed that the ratio of polymer to catalyst increased substantially by using $TiCl_3$ catalyst prepared according to the present invention.

In addition to the gram per gram catalyst-activity measurement, there are several significant properties of the polymerized material which can be examined as regards catalyst effectiveness such as isotacticity, purity, molecular weight, tensile characteristics, hardness, and melt and extrusion characteristics. The most important property of polymers, such as polypropylene, is isotacticity, which in turn largely determines the other properties. A 100 percent crystalline isotactic polypropylene polymer would be composed of

chains in helices with the side methyl group in orientation in the crystal lattice.

Two common methods for determining isotacticity are solvent extraction and X-ray diffraction. Purity can be checked by ash content analysis and melt discolorations. The most rigid solvent extraction test for polypropylene is heptane extraction, wherein the "$C_7$ solubles," including oils, waxes and most of the lower and higher atactic polymers are removed; the remaining $C_7$ insolubles are primarily isotactic, crystalline polypropylene. It was found that the percentage of $C_7$ insolubles in polypropylene produced with $TiCl_3$ prepared according to this invention averaged 80 percent. That is, the $C_7$ insoluble content is at least as high for polypropylene produced with comminuted $TiCl_3$ which was prepared without cooling.

The reference to polypropylene as a representative polymer is made for the purpose of illustration and not limitation.

The following examples are provided to further illustrate the present invention.

EXAMPLE I 75 grams of crystalline commercially pure titanium trichloride with a particle size averaging about 100 microns were loaded, under protection of argon, into a steel ball mill of the type previously described. The mill was kept in operation for three hours, under an argon atmosphere without cooling. During operation of the mill, the ambient temperature was about 50° C. At the end of the three hour period, the mill was unloaded under protection of argon. The resulting product had an average particle size of about 2 microns. Samples were taken for polymerization of propylene and the yield of the polymerization was 62.6 grams of polymer per gram of $TiCl_3$. The polymerization procedure was as follows: A one-liter reaction flask was loaded with 0.5 gram of $TiCl_3$, 1.2 to 1.5 ml. of triethylaluminum and 500 ml. toluene. The flask contents were pre-heated to 55° C. and propylene gas was bubbled through the flask contents at 1.0 liter per minute. After the start of polymerization, external heating was removed and after one hour, the reaction was stopped by the addition of 150 ml. of isopropanol and 10 ml. of HCl. The entire procedure was carried out at atmospheric pressure conditions. The polymer product was filtered out, washed with methanol and dried. Additional traces of polymer were precipitated out of the filtrate with methanol and recovered.

EXAMPLE II 75 grams of crystalline commercially pure titanium trichloride having an average particle size of about 100 microns were loaded, under the protection of argon, into the same mill as used in Example I. The mill was kept in operation for three hours under an argon atmosphere and the ambient temperature was maintained at about +10° C. At the end of the three hour period, the mill was unloaded under protection of argon. The resulting product had an average particle size of about 2 microns. Samples were taken for polymerization of propylene and the yield of the polymerization was 72.3 grams polymer per gram of $TiCl_3$, which represents an improvement of more than 15 percent over the product obtained in Example I. The polymerization procedure was the same as in Example I.

EXAMPLE III

Following the procedure of Example I, 260 grams of titanium trichloride having an initial particle size of about 100 microns were ground for 10 hours without cooling. The final particle size of the product averaged 1 micron. Samples were taken for polymerization and the same procedure as in Example I was followed except that the pressure was 30 p.s.i.g. A yield of 272 grams of polymer per gram of $TiCl_3$ was obtained.

EXAMPLE IV 187 grams of titanium trichloride were processed and employed in polymerization under the same conditions as described in Example III except that the ambient temperature during grinding was −10° C. The results obtained showed a yield of 454 grams of polymer per gram of $TiCl_3$, which represents an improvement of about 66 percent cover the product obtained in Example III. The polymer analysis showed 83.4 percent of $C_7$ insolubles.

What is claimed is:

1. A process for activating titanium subhalide for use as a catalyst material in polymerization which comprises comminuting the titanium subhalide by grinding at an ambient temperature of between about +10° C. and −10° C.

2. A process for activating titanium trichloride for use as a catalyst material in polymerization which comprises comminuting the titanium trichloride by grinding at an ambient temperature of between about +10° C. and −10° C.

3. A process for activating titanium trichloride for use as a catalyst material in polymerization which comprises comminuting the titanium trichloride by grinding at an ambient temperature of about +10° C.

4. A process for activating titanium trichloride for use as a catalyst material in polymerization which comprises comminuting the titanium trichloride by grinding at an ambient temperature of about −10° C.

References Cited by the Examiner

UNITED STATES PATENTS

| | | | |
|---|---|---|---|
| 2,893,984 | 7/1959 | Seelbach et al. | |
| 2,956,050 | 10/1960 | Benning et al. | 252—441 X |
| 2,968,652 | 1/1961 | Mertes | 252—429 X |

MAURICE A. BRINDISI, *Primary Examiner.*